March 2, 1965  C. E. WARN ETAL  3,171,662
JOINT AND PACKING RING THEREFOR
Filed Oct. 9, 1961

*INVENTOR.*
CHARLES E. WARN &
BY DOUGLAS R. GARRETT
Oberlin, Maky & Donnelly
ATTORNEYS

United States Patent Office 3,171,662
Patented Mar. 2, 1965

---

3,171,662
JOINT AND PACKING RING THEREFOR
Charles E. Warn, Los Angeles, and Douglas R. Garrett, Burbank, Calif., assignors to Parker-Hannifin Corporation, Cleveland, Ohio, a corporation of Ohio
Filed Oct. 9, 1961, Ser. No. 143,741
8 Claims. (Cl. 277—211)

The present invention relates generally as indicated to a joint and packing ring therefor, and more particularly, to a joint and packing ring therefor which is suitable for cryogenic applications and for applications wherein the parts which are to be sealed together may be warped or distorted.

In cryogenic service, the use of joints having packing rings wholly of rubber or rubber-like material is undesirable, since at sub-zero temperatures such packing rings shrink and lose their resilience whereby the joint parts engaged thereby are prone to permit leakage of fluid therepast. Even in high temperature service, such packing rings are apt to become soft and to creep or cold flow, again permitting leakage of the joint. In other applications it is required to make fluid-tight joints with thin walled members which, for example, may have curved surfaces, or due to temperature changes (increase or decrease), or to stresses, or to manufacturing tolerances, may have warped or irregular surfaces, whereby it is necessary to employ composite packing rings that can conform to such curved, irregular or warped surfaces while, at all times, maintaining a fluid-tight joint.

Accordingly, it is a principal object of this invention to provide a joint and packing ring therefor in which the packing ring is so constructed as to retain a fluid-tight joint with mating parts under any temperature conditions and despite curvature or warping of the joint surfaces with which the packing ring is engaged.

It is another object of this invention to provide a simple and compact unitary packing ring which includes rubber-like sealing portions secured to a spring element which maintains its resilience to compensate for loss of resilience of the sealing portions and for irregularities in the surfaces with which the sealing portions are engaged.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
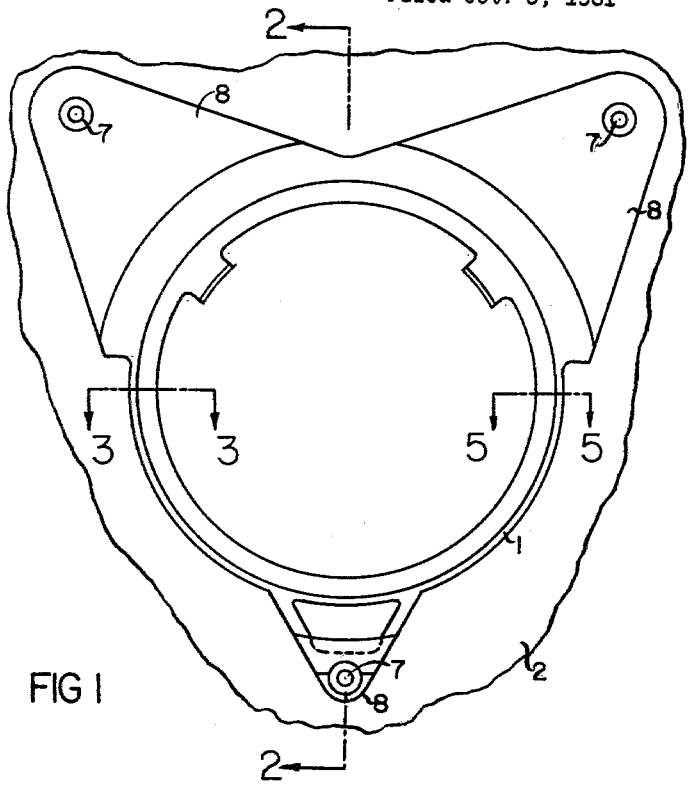
FIG. 1 is a plan view of an adapter ring secured to a thin wall member.
Figure 2:
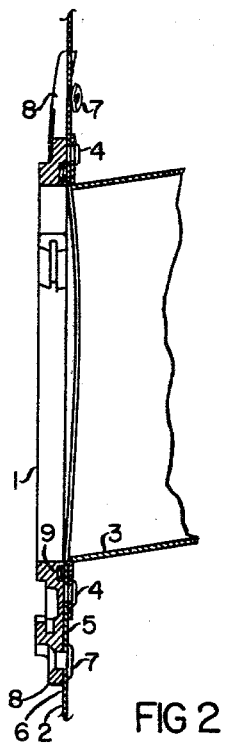
FIG. 2 is a cross-section view of the joint assembly taken substantially along the line 2—2, FIG. 1.

Referring now more particularly to the drawings, there is shown therein an adapter ring 1 which it is desired to secure in fluid-tight relation to a curved wall 2 around the mouth of the conduit 3 which is welded or otherwise secured to a doubler ring or flange 3a and which in turn is riveted as at 4 or otherwise secured to wall 2. In the present case, the mating surfaces 5 and 6 of the adapter ring 1 and of the wall 2 are cylindrical, and when the adapter ring 1 is secured to the wall as by rivets 7 in the three holes in the ears 8 thereof, the cylindrical face 5 thereof may not perfectly match the cylindrical face 6 of the wall 2 so that there may be zones of the surfaces 5 and 6 that are not in metal-to-metal contact, or even if they are initially in contact, temperature changes and/or stresses may warp or buckle the thin wall 2 or the adapter ring 1. The inner face 5 of the adapter ring 1 is formed with a circular packing groove 9 in which is disposed the composite packing ring 10 (see FIGS. 3 and 4) constituting the present invention and preferably, the bottom wall 11 of such groove 9 will have a shape so as to be generally concentric and parallel with the surface 6 of the wall but, as aforesaid, there may be instances where the distances between the wall 2 and the bottom wall 11 vary at different places around the mouth of conduit 3.

Figure 3:
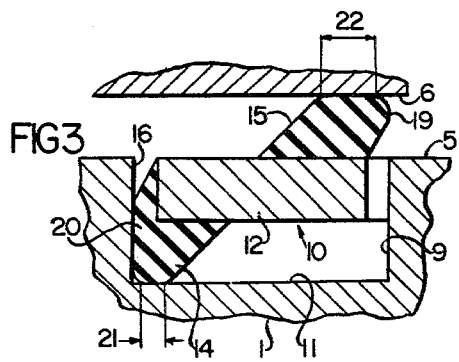
FIG. 3 is a much enlarged radial cross-section view taken substantially along the line 3—3, FIG. 1, the packing ring being shown in its normal unstressed condition prior to drawing together of the joint parts.
Figure 4:
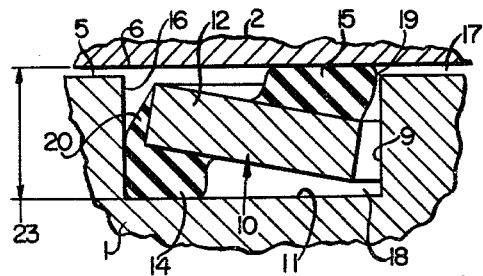
FIG. 4 is a similar enlarged radial cross-section view of the completed joint with the packing ring deformed in the packing chamber to make sealed engagement with the curved joint parts and to retain the seal despite changes in temperature, or shape of the mating surfaces.
Figure 5:
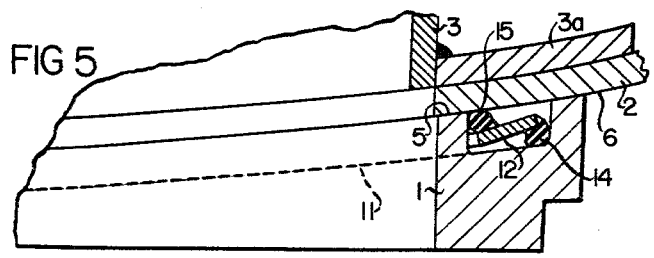
FIG. 5 is an enlarged section through 5—5 of FIG. 1.

A preferred form of packing ring 10 is disposed in such groove 9 and as best shown in FIG. 3, it comprises a spring metal ring 12 which is initially flat to facilitate manufacture thereof and to which are bonded the respective sealing portions 14 and 15 of rubber or rubber-like material, one of which (portion 14) is of angular form to make sealed engagement with the bottom and radially outer walls 11 and 16 of the packing chamber 9 and the other of which (portion 15) extends angularly inwardly as shown to make sealed engagement with the surface 6 of the wall member 2. When the adapter ring 1 and wall member 2 are assembled, as by the rivets 7, the flat metal ring 12 will assume the cylindrical shape of wall 2 within groove 9 and the sealing portions 14 and 15 will be deformed as best shown in FIG. 4, to establish a fluid-tight joint between the wall 2 and the adapter ring 1. At the same time, the opposed and radially spaced forces on the sealing portions 14 and 15 will cause resilient deformation of the spring metal ring 12 so that instead of being of planar form as in FIG. 3, it will now be of frusto-conical or dish-shape, so as to constantly urge the sealing portions 14 and 15 into fluid-tight engagement with the packing groove walls 11 and 16 and with the wall 2 even though the sealing portions may lose their resiliency owing to sub-zero temperatures or to high temperatures. Likewise, even though the cylindrical surfaces 5 and 6 may vary in spacing around the mouth of the conduit 3, the spring metal ring 12 will, nevertheless, maintain the sealing portions 14 and 15 in sealed engagement around the entire periphery. It can be seen that herein the initially flat packing ring 10 is deformed to cylindrical form to match the concentric and parallel walls 6 and 11, and at the same time, the spring metal ring 12 thereof is deformed resiliently to dish-shaped form to maintain a fluid-tight joint under all conditions of mismatch, cylindrical curvature, and of warping due to temperature and stress on the joint parts.

In addition, the present packing ring 10 is pressure seated in that fluid pressure at 17 (FIG. 4) tends to wedge the sealing portion 15 radially outward into tighter engagement with wall 2, and fluid pressure in the chamber 18 (FIG. 4) tends to force the sealing portion 14 radially outward more tightly against the wall 16 of the groove 9. Moreover, the rounded corner 19 of sealing portion 1 precludes pinching between the faces 5 and 6 at the zone 17 and also doubles for pressure loading and loading due to differential contraction of metals used in ring 10 and adapter 1.

By way of example, excellent results have been obtained in a joint for a conduit 3 of 6″ diameter and a thin wall member 2 having a surface 6 of 55″ radius, by employing a packing ring having a stainless steel ring 12 of about 0.050″ thickness and 0.16″ radial width, and sealing portions 14 and 15 of about 0.055″ axial thickness with the lip 20 of the sealing portion 14 about 0.020″ radial thickness and with the flat annular face 21 of the sealing portion 14 being of about 0.030″ radial width, and with the flat annular face 22 of the sealing portion 15 being of about 0.040″ radial width. The axial depth of the groove 9 may be about 0.105″. The total axial thickness of the packing ring 10 may be about 0.160″ in the uninstalled position. The sealing portions 14 and 15 are so located on packing ring 12, that as the axial depth 23 is reached by bringing surfaces 11 and 6 towards each other the sealing portions 14 and 15 are subjected to compressive stress and the packing ring 12 is deformed to a generally frusto-conical form. This frusto-conical form maintains nearly constant compressive stress on sealing portions 14 and 15 throughout the temperature and/or pressure cycle. The compressive stress in lip 20 between surface 16 and packing ring 12 increases with increased pressures and also increases with reduced temperatures due to the difference in coefficient of expansion of groove 9 and packing ring 12. The sides of the sealing portions 14 and 15 are inclined about 30° and 45° as shown. Accordingly, the sealing portions 14 and 15 will make sealed engagement with surfaces 11, 16 and 6 despite substantial circumferential waviness or curvature and variation of the axial depth 23 around the packing chamber defined by groove 9 and surface 6.

Other modes of applying the principle of the invention may be employed, change being made as regards the details described, provided the features stated in any of the following claims, or the equivalent of such, be employed.

We therefore, particularly point out and distinctly claim as our invention:

1. A fluid-tight joint comprising a pair of members which define therebetween an annular chamber including a pair of radially spaced apart walls and a pair of axially spaced apart walls; a composite packing ring in said chamber having radially and axially offset sealing means of rubber-like material on its opposite sides engaged with walls of said chamber adjoining diagonally opposite corners thereof; and a spring washer means to opposite sides of which said sealing means are secured; said packing ring in its initial undeformed condition having an axial dimension between opposite sides of said sealing means greater than that of said chamber whereby when said packing ring is disposed in said chamber as aforesaid, said sealing means are operative to cause resilient deformation of said spring washer means to generally frusto-conical form and said spring washer means is operative constantly to urge said sealing means into fluid-tight engagement with the axially spaced apart walls of said chamber.

2. The joint of claim 1 wherein said radially inner sealing means, in its undeformed condition, has radially inwardly sloping sides, whereby fluid under pressure exposed to said radially inner sealing means is effective to wedge the same radially outwardly between said spring washer means and the wall engaged thereby, the radially outer sealing means being retained against radial outward movement by the radially outer wall of said chamber.

3. The joint of claim 2 wherein said radially outer sealing means, in its undeformed condition, is of angular form to make sealed engagement with both one of said axially spaced apart walls and one of said radially spaced apart walls.

4. The joint of claim 2 wherein the radially innermost corner of said radially inner sealing means is rounded to preclude pinching of said sealing means.

5. A fluid-tight joint comprising a pair of members which define therebetween an annular chamber including a pair of radially spaced apart walls and a pair of axially spaced apart walls; a composite packing ring in said chamber having radially and axially offset sealing means of rubber-like material on its opposite sides engaged with walls of said chamber adjoining diagonally opposite corners thereof; and a spring washer means to opposite sides of which said sealing means are secured, the remaining surface of said spring washer means to which said sealing means are not secured being exposed; said packing ring in its initial undeformed condition having an axial dimension between opposite sides of said sealing means greater than that of said chamber whereby when said packing ring is disposed in said chamber as aforesaid, said sealing means are operative to cause resilient deformation of said spring washer means to generally frusto-conical form and said spring washer means is operative constantly to urge said sealing means into fluid-tight engagement with the axially spaced apart walls of said chamber.

6. The joint of claim 1 wherein said spring washer means is also laterally deformable to accommodate variations in the distance between said pair of axially spaced apart walls.

7. A packing ring for installation in an annular packing chamber comprising a spring washer; radially and axially offset sealing means of rubber-like material secured on opposite sides of said washer, said sealing means being operative, when compressed between axially spaced walls of such chamber, resiliently to deform said spring washer to generally frusto-conical form, the entire surface of said spring washer being exposed except for that portion to which said sealing means is secured.

8. The packing ring of claim 7 wherein one of said sealing means, in its undeformed condition, is of angular form to make sealed engagement with two adjacent walls of said chamber.

References Cited in the file of this patent

UNITED STATES PATENTS

| | | |
|---|---|---|
| 2,757,948 | Klingler | Aug. 7, 1956 |
| 2,856,249 | Leman | Oct. 14, 1958 |
| 3,075,781 | Atikinson et al. | Jan. 29, 1963 |
| 3,106,406 | Liebig | Oct. 8, 1963 |

FOREIGN PATENTS

| | | |
|---|---|---|
| 13,928 | Great Britain | 1905 |
| 791,692 | Great Britain | Mar. 12, 1958 |
| 1,208,242 | France | Sept. 14, 1959 |